Patented July 21, 1931

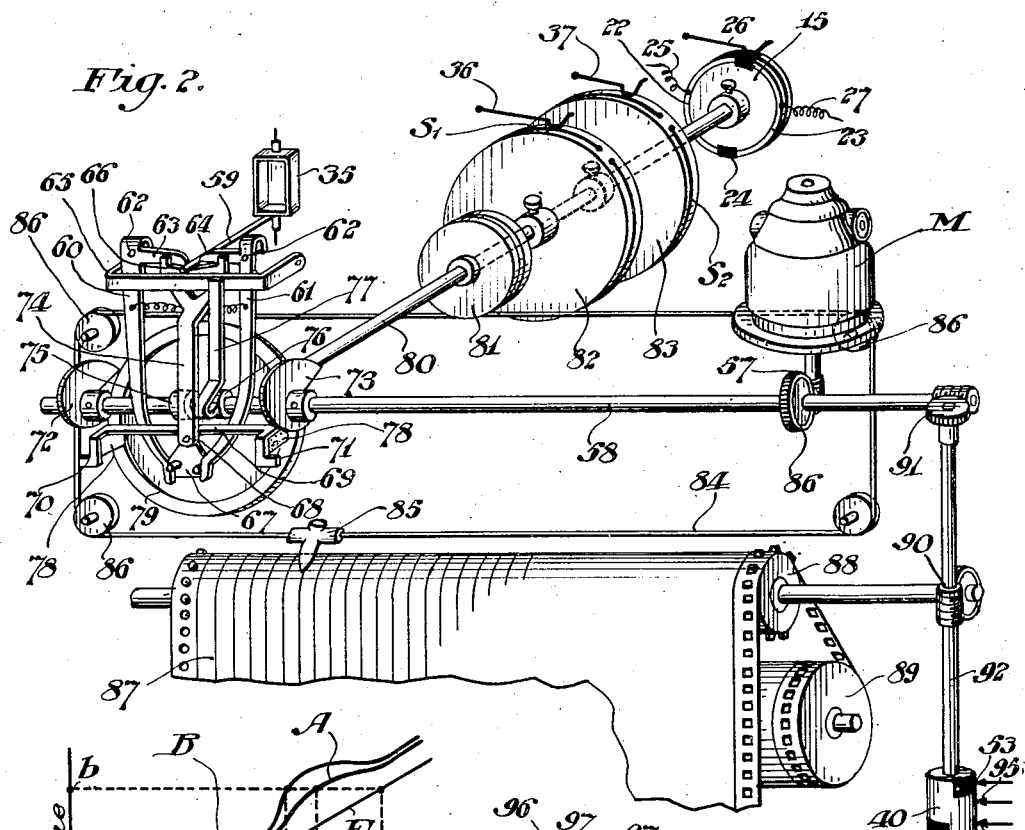

1,815,061

UNITED STATES PATENT OFFICE

JOHN W. HARSCH, OF AMBLER, AND WILLIAM R. SCHOFIELD, JR., OF PHILADELPHIA, PENNSYLVANIA, ASSIGNORS TO LEEDS & NORTHRUP COMPANY, OF PHILADELPHIA, PENNSYLVANIA, A CORPORATION OF PENNSYLVANIA

CONTROL SYSTEM

Application filed March 9, 1929. Serial No. 345,766.

Our invention relates to a system of control, and more particularly to a system of temperature control.

Our invention resides in a method of and apparatus for effecting substantially constant relation, as difference, between the magnitudes of a primary condition and a secondary condition which is dependent in magnitude on both the magnitude and rate of change of magnitude of the primary condition.

Our invention further resides in a system for controlling the magnitude of a condition with respect to the magnitude of another condition, which is, in turn, dependent upon the first condition and of lower magnitude, the second condition having a critical stage during which its rate of change of magnitude fluctuates notwithstanding different, as constant, rate of change of magnitude of the first condition.

Our invention further resides in a system of temperature control wherein a source of heat is controlled in accordance with variations in the difference between the temperature of a material to be heated and another temperature, as that of the surroundings.

Our invention further resides in a method of heat treatment wherein the supply of heat to an oven, furnace or the like, and especially to a heat treating furnace, is varied to maintain substantially constant difference between the temperature of the furnace interior, and the temperature of a material, as metal, undergoing treatment therein, during the entire heat treating process, and more particularly during the period in which the metal is passing through a decalescence or critical stage.

Our invention further resides in a system of temperature control for furnaces and the like, wherein the difference in temperature between the furnace and material disposed therein is alternately controlled and recorded; and more particularly the temperature of the material is recorded during the control period.

Our invention further resides in a method and apparatus of the character hereinafter described and claimed.

The art of heat treating metals has always been accompanied by a number of problems, some of the more important being the rate at which heat should be supplied to the heating chamber containing the metal, and the duration of the application of heat to said chamber. If heat is applied too rapidly, there is danger of "overshooting" the temperature desired, and if applied at too slow a rate the process may not only produce a product having characteristics other than those desired, but will often times be uneconomical in plants desiring large production. A previous method of heat treatment has been to apply heat at a comparatively rapid rate for a certain length of time and then to substantially reduce or shut off the supply of heat, allowing the metal to go through what is known as a "soaking period" in which it gradually increases in temperature to approximately the desired point. Furthermore, due to the limitations of usual temperature indicating devices, it is impossible to know exactly when the metal has reached the desired temperature for withdrawal from the furnace. This method, however, is obviously only approximate, since the physical properties of different batches of metal to be treated may vary somewhat, requiring different drawing temperatures for a given degree of hardness, etc., thereby necessitating a different treatment of each batch in order that the desired qualities may be attained.

In Patent 1,188,128 to W. G. Wrighton there is described and claimed a method for determining the amount of heat treatment for a metal regardless of the particular physical characteristics of the metal and without knowledge of its actual temperature. In this method the application of heat to a heating chamber containing a batch of metal to be treated is continued until its individual critical or decalescene period has been either reached or passed, depending on the degree of treatment desired. For each individual treatment an indication by thermo responsive means or equivalent, is made when the metal enters and passes through its decalescence period. During this period the rate of temperature increase of the metal is substantially reduced or is nearly zero, notwithstanding that the rate of heat supply to the heating chamber continues at substantially the same constant rate.

It will be apparent therefore that as heat is steadily supplied to a heating chamber containing the metal to be treated, the difference, or head, between the temperatures of the metal and the furnace will increase as the metal passes through its decalescence period. Our invention provides for maintaining this temperature difference or head substantially constant in order that the heat treated product may be of more uniform and higher quality than heretofore obtained by other methods.

For a detailed description of a form which our invention may take, reference is had to the accompanying drawings, in which:

Fig. 2 shows a control mechanism associated therewith.

Fig. 3 is a time-temperature chart relating to heat treatment.

Fig. 4 is a cross-sectional view of a block of metal.

Figs. 5 and 6 are time-temperature charts relating to heat treatment.

Figure 1:
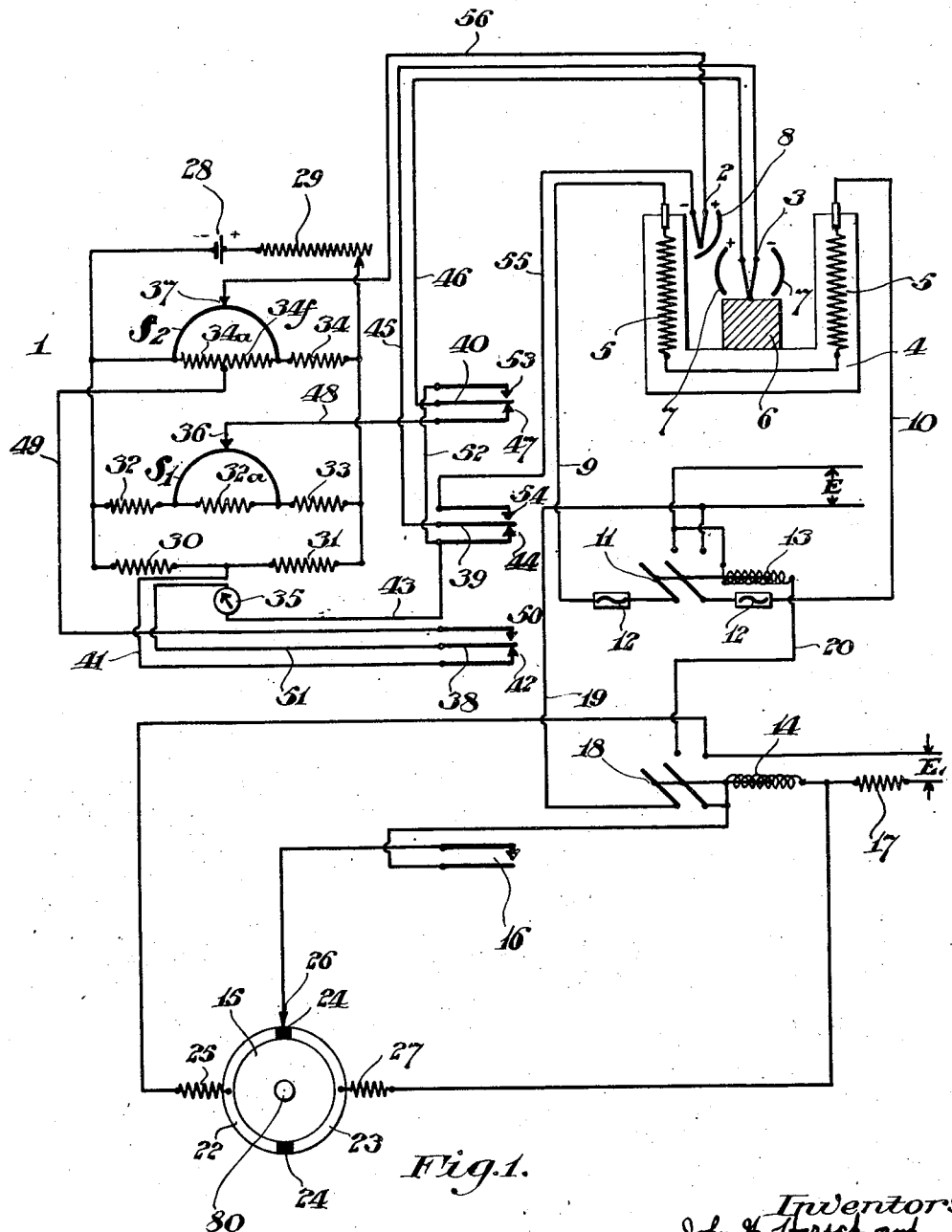
Fig. 1 is a diagrammatic illustration of a system for carrying out our invention.

Referring to Fig. 1, an electrical balancing circuit generally indicated by 1 is connected to a pair of thermo-couples 2 and 3 disposed within a heat treating furnace, or equivalent, 4, in a manner hereinafter described. Furnace 4 is heated by resistor elements 5 traversed by current from a source E. The work 6 within the heating chamber is heated as the surrounding furnace medium is heated by resistor elements 5 and also by radiant heat from said elements. Thermo-couple 3 is disposed in close relation to work 6, and is protected from the radiant heat of the furnace walls by shields 7 of any suitable construction and material so that the temperature indicated thereby will be substantially that of the work 6. Thermo-couple 2 is disposed adjacent a wall of a heating chamber and is therefore solely responsive to the temperature of the furnace medium. Shield 8 protects thermo-couple 2 from any cooling influence that the work 6 might have on it.

Resistors 5 are connected by conductors 9 and 10 to the power controlling switch 11. When switch 11 is closed, the resistors 5 are connected directly across the source of power E and supply heat at a predetermined rate to the heating chamber. Fuses 12 in conductors 9 and 10 protect the resistors from overload. The operation of switch 11 is controlled by a relay or solenoid actuated means 13 which is in turn controlled by a holding relay 14 hereinafter described. Relay 14 is adapted to be energized from source $E_1$ through predetermined simultaneous closure of switches 15 and 16. A resistance 17 is inserted in circuit therewith to limit the current through the relay. Upon energization of solenoid 14, switch 18 is closed thereby interconnecting conductors 19, 20 and permitting current to flow from source E through solenoid 13. It follows therefore that as long as switch 18 remains closed, solenoid 13 will hold switch 11 in closed position and current will traverse resistors 5 for supplying heat to the furnace. Solenoid 14, however, is adapted to be short circuited and de-energized by switches 15 and 16 upon predetermined simultaneous closure, and upon such occurrence switch 18 opens, de-energizing solenoid 13, and effecting disconnection of the resistors from the line. Switch 15 is rotated by shaft 80 and comprises conducting strips 22 and 23 insulated from each other by insulating blocks 24. Flexible conductors 25 and 27 are connected to the conducting strips 22 and 23, and are adapted to be in electrical connection with contact 26 upon rotation of switch 15 from the position shown in Fig. 1. Switches 15 and 16 cooperate with the balancing circuit 1 and the control mechanism connected therewith in a manner hereinafter described. It will be apparent that when switch 15 has rotated to such position that conducting strip 23 contacts with 26 and while in this position switch 16 closes, the solenoid 14 will be short circuited and therefore de-energized. With switch 18 in open position, solenoid 14 may only be energized again by rotation of switch 15 in the opposite direction so that conducting strip 22 contacts with 26, and while in this position switch 16 closes.

Balancing circuit 1 comprises a plurality of balancing networks or circuits, of the potentiometer type, having in common a source of electro-motive-force 28, connected in series with a limiting resistance 29, and a galvanometer 35. One network consists of resistances 30, 31, 32, 32a, slide wire resistance S1 and resistance 33, and the other network consists of resistances 34a, 34f, slide wire resistances S2 and resistance 34. Galvanometer 35 is adapted to be connected by contact mechanism hereinafter described alternately to contacts 36 and 37 cooperating with slide wire resistances S1 and S2, and their corresponding networks respectively.

When galvanometer 35 is connected to the network containing the slide wire S1, thermo-couple 3 will be individually connected in series therewith, and adjustment of contact 36 on slide wire S1 for balance of the network will indicate the temperature of thermo-couple 3 and hence the temperature of work 6. When the galvanometer 35 is connected to slide wire resistance S2 through contact 37 both thermo-couples 2 and 3 will be connected in opposing relation to each other in series in the galvanometer circuit. Since thermo-couple 2 indicates the temperature of the furnace medium surrounding work 6, it will be apparent that the balance of the network by contact 37 will indicate the temperature difference between the work and the furnace medium surrounding said work. In order to transfer connection of galvanometer 35 and the respective thermo-couples from one network to the other, switches 38, 39 and 40 are utilized, and are periodically operated simultaneously in the same direction so as to close either the upper or lower contacts. When switches 38, 39 and 40 are at their lower position the circuit is completed through conductor 41, contact 42, switch 38, galvanometer 35, conductor 43, contact 44, switch 39, conductor 45, thermocouple 3, conductor 46, switch 40, contact 47, conductor 48 to contact 36 which cooperates with slide-wire resistance S1. When the above switches simultaneously move to their upper position, the circuit is completed from the second network through conductor 49, contact 50, switch 38, conductor 51, galvanometer 35, conductor 43, conductor 52, contact 53, switch 40, conductor 46, to the positive terminal of thermo-couple 3. The negative terminal connects by conductor 45, switch 39, contact 54, conductor 55, to the negative terminal of thermo-couple 2, thereby connecting the thermo-couples 2 and 3 so that the electro-motive-forces produced therein oppose each other. The positive terminal of thermo-couple 2 connects through conductor 56, to contact 37 cooperating with slide wire resistance S2. Switch 16 moves simultaneously with switches 38, 39 and 40, and is only closed when the same are in their upper closed position. Switch 15, as illustrated in Fig. 2, also cooperates with contacts 36 and 37, so that a corresponding relative movement between each contact and its slide wire produces a corresponding movement of switch 15.

Referring to Fig. 2, there is shown a control mechanism of the character described in Leeds Patent No. 1,125,699 for automatically balancing the electrical circuits of Fig. 1 and operating the contacting mechanism connected therewith. A constant speed motor M drives through gearing 57 a shaft 58 which actuates a disengageable mechanical connection hereinafter described, and switches 38, 39 and 40. Galvanometer 35 having a pointer or arm 59 secured thereto is adapted to deflect the said arm in either one direction or the other, depending upon the magnitude of the electro-motive-forces produced by the thermo-couples. Members 60 and 61 are pivotally supported at 62 and have extending arms 63 and 64 disposed toward each other having their ends spaced so that member 59 may freely move between them. A pivoted bracket member 65 carries member 66 whose upper edge, which inclines in each direction from its center, is adapted to engage galvanometer arm 59 and move the same into engagement with either extension arm 63 or 64, depending on the deflection of galvanometer 35. In such cases member 60 or 61, as the case may be, will be rotated about its pivot and will rotate plate 67 pivoted at 68. A normally transversely extending member 69 is secured to plate 67 and rotates therewith. Member 69 has at its opposite ends extensions 70 and 71 adapted to be engaged by cams 72, 73 when arm 69 is rotated out of its normal horizontal position. Member 67 is carried by arm 74 which is pivoted at its upper end and adapted to be moved outwardly by cam 75 mounted on shaft 58. Cam 76, mounted on the same shaft also engages arm 77 carried by the pivot bracket member 65 for periodically rotating the same into engagement with galvanometer arm 59. The transversely disposed member 69 has friction elements 78 mounted on the opposite ends thereof for engagement with clutch disc 79. The operation of the disengageable clutch mechanism is as follows:

Shaft 58 which operates at constant speed has cams 75 and 76 mounted thereon so that rotation of member 69 through bracket 65, galvanometer arm 59 and arms 60 and 61, will occur only when cam 75 has rotated arm 74 in an outward direction, thereby disengaging friction members 78 from the clutch disc 79. After friction elements 78 have again come into engagement with clutch disc 79, cam 72 or 73, as the case may be, will engage either extension 70 or 71 of member 69, depending on its position. Clutch engaging member 69 may be biased towards clutch disc 79 by spring not shown, and rotation thereof by cams 72 and 73 will effect rotation of clutch disc 79 in a direction depending upon the deflection of galvanometer arm 59. Rotation of clutch disc 79 also effects rotation of shaft 80 which has mounted thereon recorder actuating pulley 81, discs 82 and 83 having mounted thereon slide wire resistances S1 and S2, respectively, and circuit controller 15 previously described. In the present instance, the contacts 36 and 37 cooperating with slide wire resistances S1 and S2 are stationary with respect to the slide wires, although it is immaterial so long as relative movement is effected between them. Pulley 81 mounted on shaft 80 is secured to a cord or other flexible member 84 having attached thereto a recording pen 85. The cord is guided by pulleys 86 so that pen 85 may move longitudinally of the axis of a recorder chart 87 in response to rotative movement of shaft 80. The recorder chart 87 is mounted on drums 88 and 89, drum 88 being driven through suitable gearing 90, 91 and 57 by motor M.

Shaft 92 which actuates the recorder chart also actuates switches 16, 38, 39 and 40. It is evident that the rate of operating the above named switches may be readily varied by interposing suitable gearing between shaft 92 and motor M. Mounted on shaft 92 is an actuating arm 93 which is adapted to close momentarily switch 16 as switches 38, 39 and 40 simultaneously move to a different circuit controlling position. For the purposes of illustration switches 38, 39 and 40 are shown as cylindrical members mounted on shaft 92, having insulating strips 94 mounted on the surface thereof for alternately breaking the circuit between the central contact, which is always in contact with a conducting surface, and the other two contacts. For example, as switch 40 rotates, central contact 95 will alternately be in conducting relation with contact 47 and contact 53. Switches 38 and 39 are so adjusted with respect to switch 40 that three pairs of contacts will be simultaneously bridged by the conducting surfaces of the switches in the manner indicated in Fig. 1.

Referring to Fig. 3 which shows a time-temperature chart, curve F indicates the temperature of a furnace medium with respect to time within a heating chamber which is supplied with heat at substantially constant rate. Fig. 4 shows a piece of work 96 which may be subjected to heat treatment, point $x$ indicating a portion of metal at the surface of the work, and point $y$ indicating a portion of metal within the body thereof. If now, as has previously been customary, heat is supplied at substantially constant rate to the heating chamber containing work 96, a time-temperature curve of that part of the metal indicated by point $x$ will take the form of curve A, while the curve representative of point $y$ within the metal 96 will take the form of curve B. It will be noted therefore that as work 96 passes through its decalescence period, indicated best by the variation in slope of curve B, a large temperature difference or head will exist between the temperature of the furnace medium and the temperature of the metal within the work. For example, assuming a normal rate of heat supply before the metal reaches its decalescence period, at a time $a$ the temperature difference between the interior of the work and the furnace medium will be D1. It will be assumed that this difference is not excessive and is entirely within the safe limit so that no checking, warping or cracking of the work will result. At time $b$ when the work is passing through its decalescence period the temperature difference between the metal within the work and the furnace will be represented by D2 and the difference between the exterior surface of the work and the furnace as D3. These comparatively large temperature differences produce abnormal stresses within the work and at its surface, and are liable to cause faults, especially as at points 97 on the work where relatively small masses of metal will be brought up to furnace temperature much sooner than the main mass of metal.

In other words, as the metal, particularly steel, passes through its critical region a certain degree of contraction takes place as contrasted with the periods both before and after the critical region during which the steel expands. It will therefore be apparent that where the piece of metal to be treated is of irregular shape, there will probably be certain portions which will tend to heat up much more rapidly than the main body of the piece. If now there is a large difference between the temperature of the furnace and the temperature of the piece at the time the decalescence period is reached, the portions of the piece which absorb the heat more quickly will be passing through the decalescence period before the main body of the piece. Upon this occurrence one portion of the piece will be contracting while another is expanding and the abnormal stresses caused thereby will produce warpage and distortion of the piece under treatment.

In the heat treatment of gears, dies, etc., it is very important that abnormal stresses be avoided in order that faults and change in the dimensions may not occur in the metal. It would follow then, referring to Fig. 3, if the same temperature difference D1 was maintained throughout the heat treating period, that the metal while passing through its decalescence period would not be subjected to the abnormal stresses set up by large temperature head as D2, and that substantially all parts of the work would simultaneously pass through the decalescence period.

Such a method is illustrated in Fig. 5, in which curve F represents the time-temperature chart of a furnace containing work 96, the heat supplied to the working chamber being controlled as hereinafter described.

Curves A and B as before, represent the time-temperature curves of points outside of and within the metal, respectively. At time $a$ a predetermined desired temperature difference D4 exists between the temperature of the metal within the work and the temperature of the furnace. At time $b$, due to the method of controlling the rate of heat supply to the heating chamber and so maintaining the temperature head constant at all times, the temperature head is D5 which is of substantially the same magnitude as temperature difference D4. It will be apparent therefore that the method illustrated in Fig. 5 will carry the metal through its decalescence period without subjecting it to the abnormal strains or stresses caused by excessive temperature differences between the furnace and the work which would tend considerably to impair the quality of the finished product.

Fig. 6 is a time-temperature chart showing a heating curve 98 for the work and a temperature difference curve 99. As the cold work is first placed in the furnace the temperature difference will increase for a short time and then decrease as the work begins to absorb heat at an appreciable rate. Portions 100 and 101 of curve 99 represent the difference in temperature between the metal and the furnace medium in accordance with the methods illustrated by Figs. 5 and 3 respectively. The decalescence period of the metal is clearly indicated by the marked change in slope of portion 101.

The operation of the system is as follows:

Assuming motor driven shaft 92 to be in such position that thermo-couple 3, which is in contact with work 6, is in the galvanometer circuit, galvanometer 35 will be deflected in a direction depending upon the electro-motive-force produced by thermo-couple 3, said electro-motive-force being representative of the temperature of work 6. As galvanometer arm 59 is deflected in one direction or the other, shaft 80 will be rotated in a corresponding direction through the disengageable clutch mechanism previously described, and slide wire S1 mounted on disc 82 will be adjusted with respect to contact 36 until the potentiometer circuit has arrived at a new balance, which will occur when galvanometer 35 is not deflected and arm 59 is in the space between the extensions of arms 60 and 61. While shaft 80 is rotating slide wire S1 to balance the circuit, the recorder pulley 81 moves recorder pen 85 transversely with respect to chart 87 and so produces a record thereon of the temperature of the work within the heating chamber.

After a predetermined interval of time, switches 38, 39, 40 will have rotated to connect thermo-couples 2 and 3 in opposition to each other in the galvanometer circuit which cooperates with slide wire S2. Since the electro-motive-forces of thermo-couples 2 and 3 are opposed to each other, the resultant electro-motive-force will be representative of the difference between the temperature of the furnace medium within the heating chamber and the temperature of the work itself. As before, galvanometer 35 will deflect according to the magnitude of the resultant electro-motive-force and will rotate shaft 80 and slide wire resistance S2 through the aforesaid clutch mechanism in such direction as to effect a balance of the circuit. Switch 15 rotates simultaneously with disc 83 carrying slide wire S2 and upon a predetermined low temperature difference for example, shaft 80 will rotate switch 15 in such direction, i. e. clockwise, that contact 26 is engaged by conducting strip 22. Accordingly the recorder pen will move towards the right of the chart, indicating low temperature difference. When the control mechanism of Fig. 2 has reached its balanced position, and has recorded through pen 85 and chart 87 the temperature difference between the furnace medium and the work therein, member 93 mounted on shaft 92 comes into engagement with a resilient member 102 comprising a contact of switch 16 and momentarily closes the contacts of switch 16. Referring to Fig. 1, it will be noted that when switch 15 has rotated to a position indicating too low temperature difference, as when conductor 25 and contact 26 are connected by conducting strip 22, momentary closure of switch 16 will energize solenoid 14 from source E1 and close switch 18 which in turn energizes the actuating means for switch 11 and connects resistors 5 to the source of electro-motive-force E. The rate of heat supply to the heating chamber will be therefore increased and the temperature difference between the furnace medium and the work will accordingly increase. If the temperature difference exceeds a predetermined amount, switch 15 will have rotated counter-clockwise to such position that contact 26 is engaged by conducting strip 23, and upon closure of switch 16 solenoid 14 is short circuited and de-energized, thereby effecting opening of switches 18 and 11 to cut off the supply of heat to the furnace.

The duration of the periods for connecting the work thermo-couple, and both thermo-couples in opposition, to the balance circuits may bear any desired ratio to each other, by proper proportion of the insulating and conducting strips of switches 38, 39 and 40. As switch 16 will be closed by arm 93 approximately at the end of the time interval during which the thermo-couples are connected in opposition to the galvanometer circuit, the succeeding time interval during which the work couple alone will be connected to the galvanometer circuit will be the control period and it is preferably longer in duration than the preceding period which does not control but only determines and records the temperature difference between the furnace and the work therein. During such recording period, the position of switch 15 will have no effect upon the control circuit as switch 16, which must be closed in order to change the control in either direction, is open except at the end of the interval during which the temperature difference is determined and recorded.

The predetermined temperature difference at which the network or balancing circuit will be in equilibrium may be arbitrarily determined by rotating shaft 80 to a position, indicated by marker 85, representative of said temperature difference, and thereupon adjusting switch 15 with respect to shaft 80 in a neutral position, as shown in Fig. 1.

By our system of control it is therefore possible to choose a predetermined temperature difference and to establish and maintain the same between the metal and the heating chamber by varying the rate of application of heat to said chamber, while at the same time gradually increasing the temperature of the metal to and through its decalescence stage.

An important factor in the heat treatment of metal is the accurate determination of the decalescence period of the metal subjected to treatment. By referring to Fig. 3, in which the temperature head is noted to increase rapidly as the metal starts passing through its decalescence period, curve A is representative of the effect produced by the single thermocouple 3 which is in contact with the exterior of the work. Since the slope of curve A does not change abruptly at the beginning of the decalescence period, the limits of the period, and therefore the precise time at which the work should be withdrawn and quenched, is difficult to determine. The shape of curve A therefore would indicate that the excessive temperature head forces the heating of the metal to such an extent that the decalescence period is not sharply defined. By maintaining a substantially constant temperature head as illustrated in Fig. 5, the time temperature curve A, which is also representative of the temperature of the work at its exterior surface, is noted to break sharply at both the beginning and end of the decalescence period. This is due to the fact that the heating is not forced, and the metal is permitted to pass through its decalescence stage at a normal rate. It follows therefore that the curve A of Fig. 5 is a far more accurate indication of the decalescence period of the metal than the curve previously referred to, and the workman in charge of the treatment may obtain better results as well as a more uniform product due to the elimination of chance in determining the withdrawing and quenching point of the work.

It shall be understood that the heating chamber diagrammatically illustrated in Fig. 1 may be heated in different ways, and by way of example may be of the gas-fired type. In this case, relay 13 instead of controlling a switch would control a valve, or valves, for regulating the supply of fuel and/or air to the combustion chamber of the furnace.

It shall be further understood that our invention is not necessarily limited to the heat treatment of metals within the usual meaning of the term, but is applicable in any case where it is desired to maintain substantially a constant difference between the temperature of a source of heat and the temperature of a heat-receiving material.

Although our invention has been specifically described and illustrated as applied to the decalescence stage of a metal during heat-treatment of the same, it shall be further understood that it is equally applicable to other critical stages, including the recalescent stage.

For the purpose of brevity in the above specification and appended claims, the degree by which the temperature of the source exceeds the temperature of the heat-receiving material is termed "temperature head".

It shall be further understood that an arrangement of multiple temperature responsive devices, as thermo-couples, may be employed, as in the Martin Patent No. 1,550,272, August 18, 1925, to increase the sensitivity or range of the means responsive to temperatures of the source and/or work. Accordingly, the appended claims shall not be interpreted as limiting the use of temperature responsive means associated with the source or work to a single thermo-responsive device or thermo-couple.

What we claim is:

1. In combination, a source of heat, a furnace, means for controlling supply of heat to said furnace, thermo-responsive means jointly responsive to the temperatures of said source and a material heated thereby for actuating said first-named means, and means for alternately recording the temperature of said material and the difference in temperature between said material and said source.

2. In a system of heat treatment for metals, a source of heat, a furnace, means for controlling supply of heat to said furnace by and in accordance with variations in difference between the temperature of said furnace and the temperature of metal disposed therein, and means for alternately recording the temperature of said metal and the aforesaid temperature difference.

3. In a system of temperature control, a source of heat, structure heated thereby, thermo-responsive means individually disposed in said structure adjacent said source and a heat-receiving material respectively, means for alternately recording the temperature of said material and the difference in temperature between said material and source, and control apparatus associated with said means for varying the supply of heat to said structure from said source in response to variations in difference between the temperatures of said source and said material during the period in which temperature of the material is recorded.

4. In a system of temperature control, a source of heat, a furnace heated thereby, control apparatus periodically responsive to variations in difference between the temperature of said source and a metal within said furnace receiving heat therefrom, and means actuated by said apparatus for varying the supply of heat from said source comprising a relay adapted to be energized in response to a predetermined aforesaid temperature difference and to be de-energized after a predetermined period in response to a different temperature difference.

5. In a system of temperature control, a composite electrical network comprising a plurality of balancing circuits having a galvanometer and a source of electromotive force in common, circuit controlling means for associating said galvanometer with each of said circuits and with thermo-responsive elements affected by different temperatures, and means actuated in response to deflection of said galvanometer to control a supply of heat to maintain substantially constant difference between said temperatures.

6. In a heat-treating system, a composite electrical network comprising a plurality of balancing circuits having a galvanometer and a source of electromotive force in common, circuit controlling means for assoiating said galvanometer with each of said circuits and with thermo-elements affected by the temperatures of a source of heat and of metal heated thereby respectively, and means actuated in response to deflection of said galvanometer to control supply of heat to said source to maintain substantially constant difference between the temperature of said source and the temperature of said metal.

7. In a heat-treating system, a composite electrical network comprising a pair of potentiometer circuits having a galvanometer and a source of electromotive force in common, circuit controlling means for associating said galvanometer with one of said circuits and a thermo-element affected by the temperature of a metal undergoing heat treatment and for associating said galvanometer with the other of said circuits and a pair of thermo-elements affected respectively by the temperatures of a source of heat and of said metal, and movable structure actuated in response to deflection of said galvanometer while associated with said last-named potentiometer circuit for controlling supply of heat to said source.

8. In combination, a source of heat, a furnace, means for controlling supply of heat to said furnace, a thermo-element responsive to temperature of said source, a thermo-element responsive to temperature of material heated by said source, recording mechanism, and means for alternately associating both of said thermo-elements with said controlling means for maintaining a constant temperature difference between said source of heat and said material, and one of said thermo-elements with said recording mechanism for recording temperature.

9. In combination, a source of heat, a furnace, means for controlling supply of heat to said furnace, a thermo-element responsive to temperature of said source, a thermo-element responsive to temperature of material heated by said source, recording mechanism, and means for alternately associating both of said thermo-elements with said controlling means for maintaining a constant temperature difference between said source of heat and said material, and said second thermo-element with said recording mechanism for recording temperature of said material.

10. In combination, a pair of thermo-couples, control means, recorder mechanism, and means for alternately connecting one of said thermo-couples in circuit with said recorder mechanism, independently of said control means, to produce a record corresponding to the electro-motive force produced thereby, and both of said thermo-couples in series opposition for operation of said control means in response to the difference between the electro-motive forces produced thereby.

11. In combination, control means, a responsive element, a second responsive element, recorder mechanism, and means for alternately associating said control means with both of said elements for effecting a control in accordance with the joint response thereof, and said recorder mechanism, independently of said control means, with one of said elements for recording the magnitude of its sole response without effecting a control.

12. In combination, control means, a responsive element, a second responsive element, recorder mechanism, and means for alternately associating said control means with both of said elements for a period of time to effect a control in accordance with the joint response thereof, and said recorder mechanism with one of said elements for a longer period of time to record the magnitude of its sole response.

JOHN W. HARSCH.
WILLIAM R. SCHOFIELD, Jr.